12) United States Patent
Healy et al.

(10) Patent No.: US 8,121,116 B1
(45) Date of Patent: Feb. 21, 2012

(54) INTRA CHANNEL VIDEO STREAM SCHEDULING

(75) Inventors: Michael Healy, Berlin, MA (US); Yuen-Wen Lee, Milpitas, CA (US); Yi Tong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 12/130,305

(22) Filed: May 30, 2008

(51) Int. Cl.
H04L 12/28 (2006.01)
(52) U.S. Cl. ......... 370/389; 370/349; 370/235; 370/253
(58) Field of Classification Search .................. 370/395, 370/350; 709/240
See application file for complete search history.

(56) References Cited

U.S. PATENT DOCUMENTS

| 5,497,200 | A | 3/1996 | Otaki et al. |
| 5,543,853 | A | 8/1996 | Haskell et al. |
| 5,543,854 | A | 8/1996 | Morikawa et al. |
| 5,565,924 | A | 10/1996 | Haskell et al. |
| 5,594,553 | A | 1/1997 | Sato |
| 5,740,186 | A | 4/1998 | Widmer |
| 5,828,414 | A | 10/1998 | Perkins et al. |
| 5,862,450 | A | 1/1999 | Mandal et al. |
| 5,905,732 | A | 5/1999 | Fimoff et al. |
| 6,101,195 | A | 8/2000 | Lyons et al. |
| 6,247,061 | B1 * | 6/2001 | Douceur et al. ............... 709/240 |
| 6,822,974 | B1 * | 11/2004 | Vaidya .......................... 370/512 |
| 7,173,945 | B1 | 2/2007 | Liu et al. |
| 7,499,446 | B1 * | 3/2009 | Gou et al. ...................... 370/389 |
| 2006/0168612 | A1 * | 7/2006 | Chapman et al. ............... 725/11 |
| 2008/0144501 | A1 * | 6/2008 | Nagy et al. .................... 370/235 |

OTHER PUBLICATIONS

Cisco Systems, Inc., "Cisco uMG9850 QAM Module", c. 1992-2004.
Stolowitz Ford Cowger LLP, Listing of Related Cases, Jun. 29, 2011.
ISO/IEP "Information Technology—Generic Coding of Moving Pictures and Associated Audio Information: Video", ISO/ IEC 13818-2, 1995.

* cited by examiner

*Primary Examiner* — Dang Ton
*Assistant Examiner* — Pamit Kaur
(74) *Attorney, Agent, or Firm* — Stolowitz Ford Cowger LLP

(57) ABSTRACT

In one embodiment, a gateway between a variable delay network and a constant delay network receives over the variable delay network a plurality of data streams to be multiplexed over a modulated channel extending through the constant delay network. A first processing component of the gateway generates command-packet-descriptors corresponding to content packets included in the received data streams. A second processing component of the gateway uses transmit time indications included in the command-packet-descriptors to schedule transmission of modulated packets representing the received data streams over the modulated channel.

20 Claims, 4 Drawing Sheets

| QAM ID 101 | Flow ID 102 | | Delivery Time 103 | |
|---|---|---|---|---|
| | | | | DT for pkt. M ─ 36 |
| | | | Address 104 | |
| P 105 | C 106 | T 107 | R 108 | CC 109 | PID 110 | PCR Offset Ext. 111 |
| | | | PCR Offset Base 112 | |

15 (pointing to top area)

FIG. 3

INTRA CHANNEL VIDEO STREAM SCHEDULING

TECHNICAL FIELD

The present disclosure relates generally to the field of networking.

BACKGROUND

Cable operators have widely deployed high-speed data services on cable television systems. These data services allow subscriber-side devices, such as personal computers, to communicate over a cable network. A Modular Cable Modem Termination System (M-CMTS) connects the cable network to a data network, such as the Internet. A downstream Universal Edge Quadrature Amplitude Modulation (UEQAM) located in the cable network receives data transferred over a packet switched portion of the network from the M-CMTS and/or other network devices such as video servers, performs modulation and other processing, and then transfers the modulated data over Quadrature Amplitude Modulation (QAM) channels extending through a constant delay Hybrid Fiber Coaxial (HFC) portion of the cable network.

Some of the data received over the packet switched network is in the form of data streams, such as a Motion Picture Experts Group (MPEG) encoded/compressed video streams. The MPEG data can be CBR (Constant Bit Rate) or VBR (Variable Bit Rate). Because the corresponding modulated data flow for each video stream consumes only a fraction of the available bandwidth of each QAM channel, it is desirable to schedule many of the modulated data flows into each QAM channel in an efficient manner. The disclosure that follows solves this and other problems.

BRIEF DESCRIPTION OF THE DRAWINGS

FIG. 3 illustrates one example of the command-packet-descriptor shown in FIG. 2.

DESCRIPTION OF EXAMPLE EMBODIMENTS

Overview

In one embodiment, a gateway between a variable delay network and a constant delay network receives over the variable delay network a plurality of data streams to be multiplexed over a modulated channel extending through the constant delay network. A first processing component of the gateway generates command-packet-descriptors corresponding to content packets included in the received data streams. A second processing component of the gateway uses transmit time indications included in the command-packet-descriptors to schedule transmission of modulated packets representing the received data streams over the modulated channel.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
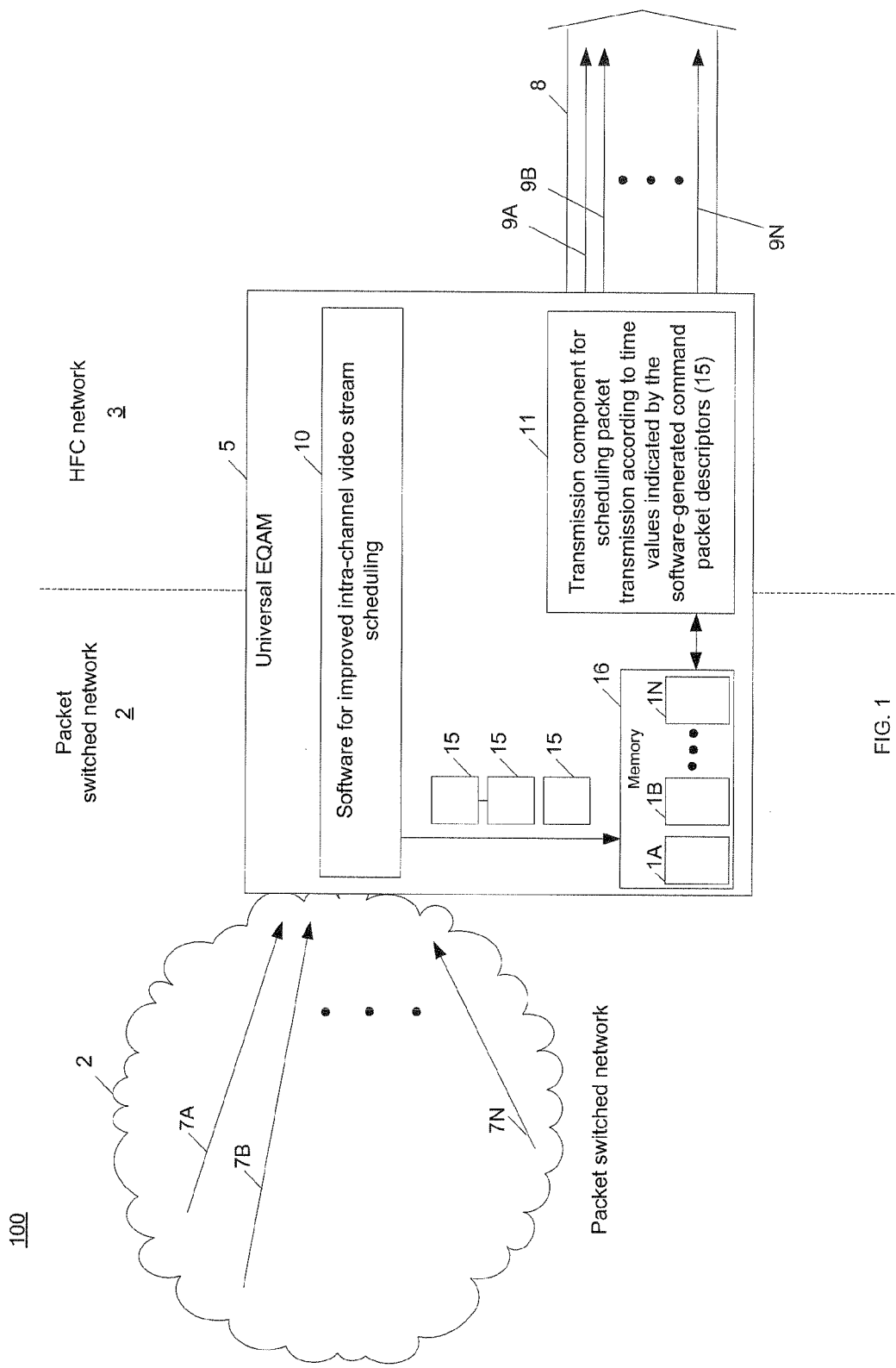
FIG. 1 illustrates an example system including a Universal Edge Quadrature Amplitude Modulation (UEQAM) having improved intra-channel video stream scheduling.

FIG. 1 illustrates an example system including a Universal Edge Quadrature Amplitude Modulation (UEQAM) having improved intra-channel video stream scheduling.

The system 100 includes a UEQAM 5 that operates as a gateway between the packet switched network 2 and the Hybrid Fiber Coaxial (HFC) network 3. The UEQAM 5 is a downstream UEQAM, receiving video streams 7A through 7N over network 2 and sending modulated flows 9A though 9N over a Quadrature Amplitude Modulation (QAM) channel 8 extending through the HFC network 3 to set-top boxes or other decoders. The UEQAM 5 is a "Universal" EQAM, which means that it can process Data Over Cable Interface Specification (DOCSIS) data as well as Traditional-Video data.

The UEQAM 5 includes software 10 for providing preferred transmit times. As will be explained in greater detail later with reference to FIG. 2, the software 10 generates command-packet-descriptors 15 corresponding to MPEG packets received via the video streams 7A-N. The generated packets 15 contain preferred transmit times that can be used for ordering transmission of the MPEG packets over the QAM channel 8. The generated packets 15 are stored in command-packet-descriptor queues 1A-N in a memory 16 of the UEQAM 5, where they are accessed by the scheduling component 11 for scheduling transmission of the MPEG packets. The scheduled transmission controlled by the component 11 according to the packets 15 generated by the software 10 allows the flows 9A-9N to be multiplexed over the QAM channel 8 and still recoverable by respective destination decoders. Again, the descriptor packet generation by the software 10 and the scheduling by the component 11 will be explained in greater detail later with reference to FIG. 2.

Still referring to FIG. 1, the balanced operation of the software 10 generating the descriptor packets and the component 11 managing scheduling according to the generated packets 15 has been empirically shown to provide a desirable balance between manufacturing cost and UEQAM performance. For example, in contrast to other proposed solutions that are more reliant on software (more software specific implementations) and which can over utilize an UEQAM Central Processing Unit (CPU) or other general software execution engine when the number of modulated flows scheduled inside a channel exceeds approximately ten, the balanced approach of the system 100 can schedule more than ten flows inside a channel without over utilizing the UEQAM 5 CPU. Moreover, in contrast to other proposed solutions that are more reliant on complex discrete processing components (more hardware specific implementations), the system 100 is cost effective.

Accordingly, the balanced framework for the system 100 can realize benefits provided by MPEG-4 and any other video compression protocols that can generate high quality video streams that consume little bandwidth. For example, the system 100 can schedule X flows, each representing an MPEG-4 encoded video stream, onto the QAM channel 8, which in the present example is an International Telecommunication Union (ITU-T) J.83 Annex-A-QAM256 channel having approximately 52 Mbps of data throughput.

Also, although the system 100 communicates MPEG-4 packets, also known as H.264 or MPEG-4 Advanced Video Coding (AVC), it should be apparent that the principles described herein can be applied to other data compression protocols. For example, the principles described above can be used with any MPEG packets, such as MPEG packets corresponding to MPEG-1, MPEG-2, etc. Moreover, any type of compressed data streams, not just video streams, can be multiplexed onto a modulated channel using the principles described above, including DOCSIS streams.

The distinction between the software 10 and the component 11 in the system 100 should be apparent. For example, the software 10 includes instructions stored on a computer readable medium that, if executed by a general purpose execution engine for the UEQAM 5, generate the command-packet-descriptors 15. The component 11 is a discrete processor or other controller that operates substantially independently of the general purpose execution engine. Accordingly, the packet generation and scheduling are a type of parallel processing scheme where a first processor (the general purpose execute engine executing the software 10) generates the command-packet-descriptors 15 and a second processor (the component 11) schedules transmission according to the generated packets 15.

Although the system 100 includes a UEQAM 5, it should be understood that the principles described herein can also be applied to Traditional-Video EQAMs. Although the system 100 is a DOCSIS cable network system, it should be apparent that the principles described herein can be applied to any gateway between a variable delay network and a constant transmission delay network.

In the present example, each of the video streams 7A-N includes Video On Demand (VOD) or Anything On Demand (xOD) content. Accordingly, each of the video streams 7A-N can be dynamically started, modified or stopped by a corresponding subscriber operating a downstream device. In other examples, any type of data streams can be processed by the gateway for scheduling inside a modulated channel.

Figure 2:
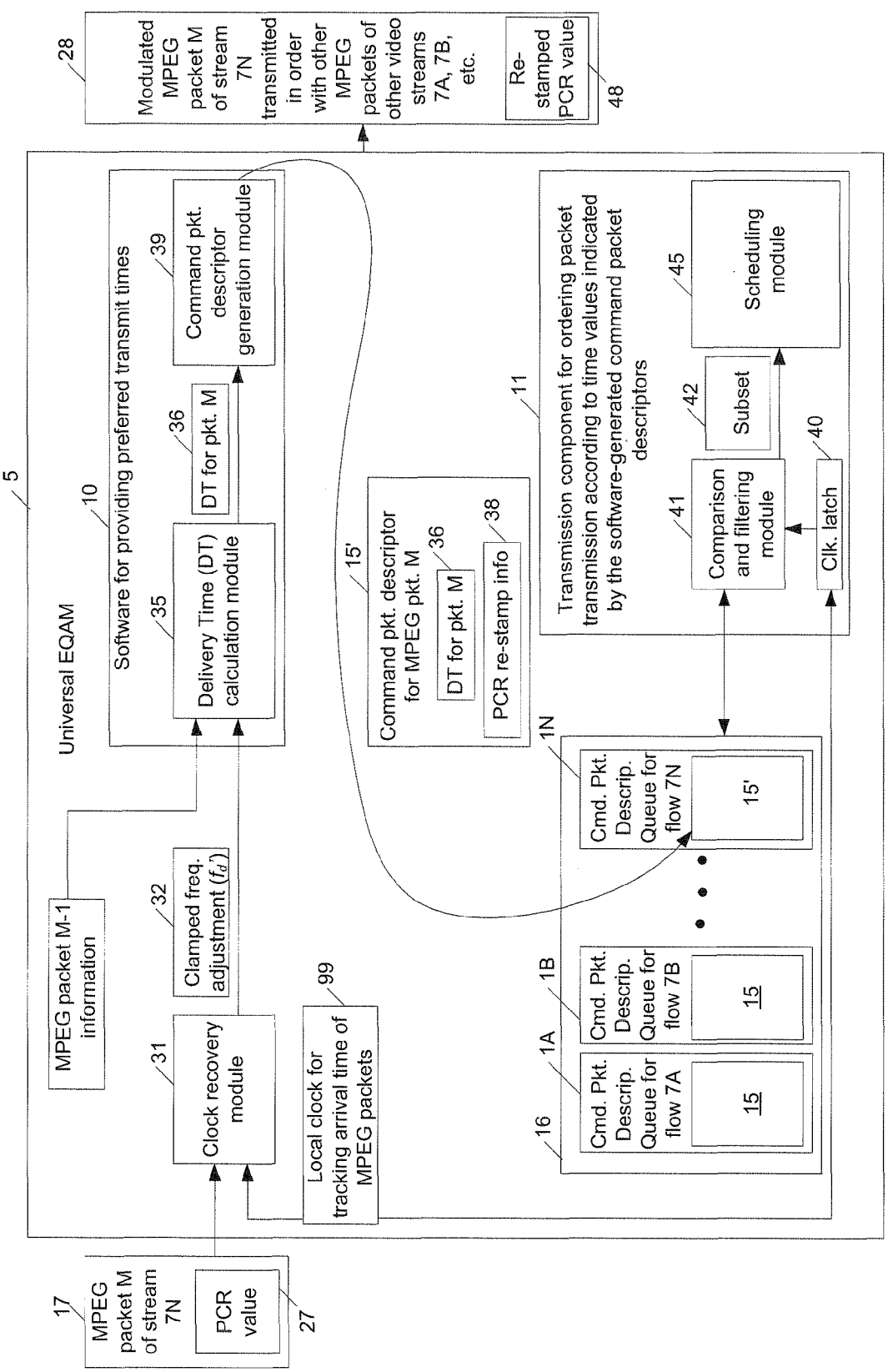
FIG. 2 illustrates one example of how the UEQAM shown in FIG. 1 schedules a plurality of modulated flows in a Quadrature Amplitude Modulation (QAM) channel.

FIG. 2 illustrates one example of how the UEQAM shown in FIG. 1 schedules a plurality of modulated flows in a Quadrature Amplitude Modulation (QAM) channel.

As explained previously, the UEQAM 5 is configured to receive a plurality of video streams 7A-N, each containing MPEG packets. For ease of illustration, only one of those MPEG packets M of one of those video streams 7N has been shown.

The UEQAM 5 receives, from stream 7N, the MPEG packet M having Program Clock Reference (PCR) value 27. Because the MPEG packet M was transferred over a variable delay packet switched network, the UEQAM 5 will recover the source clock using clock recovery module 31. This "dejittering" process is performed by the clock recovery module 31, which generates a frequency adjustment ($f_d$) 32 based on the PCR value 27 and a receive time indicated by a local clock 99. The clock recovery module 31 can be implemented using components separate from the software 10 as shown in FIG. 2, or integrated into the software 10. Any type of clock recovery module can be used, for example the clock recovery module explained in greater detail in U.S. Publication 2006/0146815, which is incorporated by reference in its entirety.

The Delivery Time (DT) calculation module 35 calculates an ideal output time for a modulated representation of the MPEG packet M based on the local clock 99. This DT value 36 will be used by the component 11 to allocate an output slot in the QAM channel associated with stream 7N based on contention resolution with other MPEG packets from other video streams associated with the QAM channel. The DT value 36 is calculated based on the frequency adjustment 32 and information from a previously processed MPEG packet M−1.

The specific calculation process used to calculate the DT value 36 depends on whether the associated MPEG packet carries a PCR value. Here, where the illustrated MPEG packet M contains a PCR value 27, the DT value 36 is equal to $DT(m-1)+(1-f_d)(PCR(m)-PCR(m-1))$. In other words, the DT value for packet M is based on the DT value of a previous MPEG packet, the frequency adjustment 32, and the difference between PCR values of the packet M and the previous packet.

In other examples, where a received MPEG packet Z does not include a PCR value, the DT for such a received packet Z is $DT(z-1)+(TPinterval)(TPI(z)-TPI(z-1))$, where the TPinterval is a calculated value based on the delivery time increment between adjacent MPEG packets, and TPI(z) and TPI(z−1) are TransPort (TP) Indexes extracted from the respective MPEG packets Z and Z−1. The DT calculation module 35 can use any process for calculating the ideal output time for a representation of the MPEG packet M based on a dejitter value and information from a previously received MPEG packet. It should be understood that, although the DT calculation module 35 is integrated into the software 10 in the present example, in other examples a separate component can provide the DT value 36 to the software 10.

Once the DT value 36 is calculated, the module 39 generates a command-packet-descriptor 15' corresponding to the MPEG packet M. The command-packet-descriptor 15' contains the DT value 36, and in the present example contains other information, such as an identifier for the associated QAM channel and an identifier for the stream 7N, which will be explained later in greater detail with reference to FIG. 3. Since the MPEG packet M contained a PCR value, the command-packet-descriptor 15' also contains PCR re-stamping information 38 to be used by the scheduling component 11.

Still referring to FIG. 2, the command-packet-descriptor 15' is stored in the respective command-packet-descriptor buffer queue 1N according to a stream identifier included in the command-packet-descriptor 15'. In the present example, the buffer queues 1A-1N each have a four command-packet-descriptor depth; however, in other examples the queues could have any depth. After each of the packet queues 1A-N contains at least one of the command-packet-descriptors 15 (or 15' in the case of packet queue N), the clock latch 40 provides a latched clock value for use by the comparison and filtering module 41. The module 41 then identifies a range of time values, the range bounded by the latched clock value and another earlier clock value. The earlier clock value can be a value determined by subtracting a configurable amount from the latched clock value.

The module 41 compares the DT values included in each of the stored command-packet-descriptors 15/15' to the time range that is based on the latched local clock value. For DT values having a time value occurring later in time than the time values in the range, the module 41 holds these command-packet-descriptors 15 to be re-compared at a next process. For DT values having a time occurring earlier than the time values in the range, the module 41 causes the corresponding MPEG packets to be dropped. Similarly, the command-packet-descriptors 15 having these DT values are removed from the memory 16. In other words, the module 41 filters the set of N command-packet-descriptors 15/15' into a smaller command-packet-descriptor subset 42 that contains only those command-packet-descriptors 15/15' having DT values in the range.

The scheduling module 45 then schedules transmission of modulated MPEG packets corresponding to the control packets 15/15' associated with the subset 42 to be scheduled. The modulated MPEG packets are scheduled for transmission in an order determined by the DT values of the command-packet-descriptors 15/15' in the subset 42. Specifically, those modulated MPEG packets having the earliest DT values are transmitted before those MPEG packets having DT values very close to, or matching, the latched clock value. For example, if the DT value 36 for the command-packet-descriptor 15' is the closest to the latched clock value out of the command-packet-descriptor 15 of the subset 42, then the modulated MPEG packet M will be the last one of the corresponding modulated MPEG packets to be transmitted. The scheduling module 45 can also schedule MPEG NULL Packets (MPEG packets having a PID value set to 13'h1FFF) to fill in unaccounted for time periods in conformance with the ITU-T J.83 transmission standard.

In the present example, in addition to scheduling, the module 45 also re-timestamps the modulated MPEG packet M with the PCR value 48 according to PCR value information 38 included in the command-packet-descriptor 15'. It should be understood that another component besides component 11 can perform re-stamping.

Thus, as explained previously, the modulated packets for the modulated flows 7A-N are transmitted in order over the same QAM channel without over-consuming general processing resources of the UEQAM 5. Similarly, the principles described above leverage the general processing resources in a way that greatly minimizes the manufacturing cost of the UEQAM 5.

FIG. 3 illustrates one example of the command-packet-descriptor shown in FIG. 2.

The command-packet-descriptor 15' includes a QAM ID field 101 indicating an associated QAM channel. The Flow ID field 102 indicates which flow on the associated QAM channel is associated with the command-packet-descriptor 15'. The Delivery Time field 103 includes the DT value 36, which was previously discussed in detail. The Address field 104 is a thirty two bit field indicating a location in memory for the corresponding MPEG packet M to be transmitted. The scheduling component uses this field to fetch the corresponding MPEG/data packet M from memory for ordered transmission according to the DT value 36.

The P field 105 can be set to cause the transmission component to replace the thirteen bit Package Identifier (PID) in the corresponding MPEG packet M with the PID value in the PID field 110. The C field 106 can be set to cause the transmission component to replace the four bit continuity counter in the corresponding MPEG packet M with the continuity counter in the field 109. The T field can be set to cause the transmission component to modify the PCR value in the corresponding MPEG packet M according to the fields 111 and 112. The T field is set in the command-packet-descriptor 15' because the MPEG packet M contained a PCR value. The R field 108 is reserved.

Figure 4:
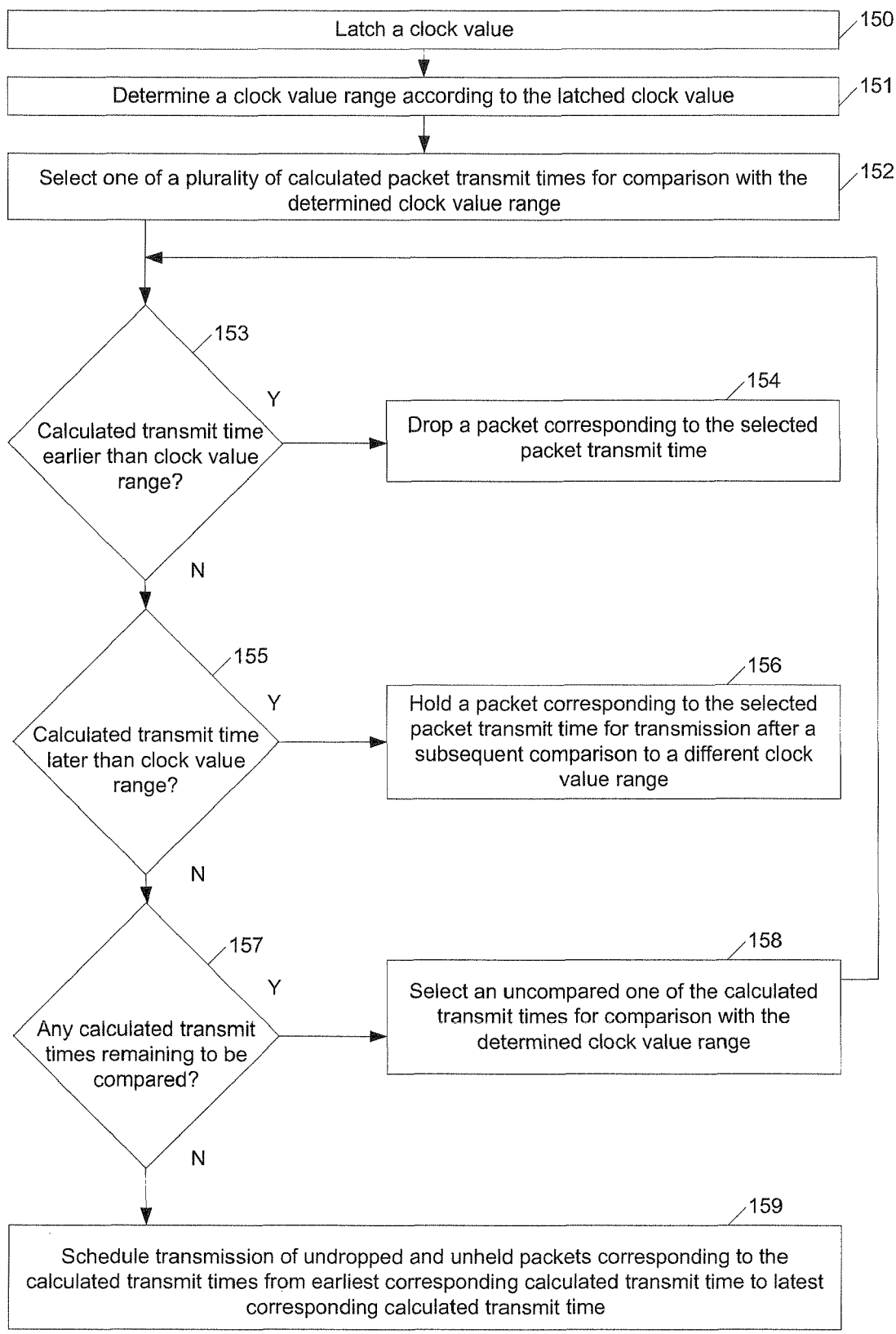
FIG. 4 illustrates an example method for using the UEQAM illustrated in FIGS. 1 and 2.

FIG. 4 illustrates an example method for using the Universal UEQAM illustrated in FIGS. 1 and 2.

In block 150, the UEQAM 5 latches a clock value. The UEQAM 5 determines a clock value range according to the latched clock in block 151. The clock value range can be determined based on an input such as a configurable register. Alternatively, the clock value range can be based on an analysis of attributes of the received video streams. In block 152, the UEQAM 5 selects one of a plurality of calculated packet transmit times for comparison with the determined clock value range. The packet transmit times are provided by a different processing component than a processing component to be used for the comparison.

If the calculated transmit time is earlier than the clock value range in decision block 153, in block 154 the UEQAM 5 drops a packet corresponding to the selected packet transmit time. If the calculated transmit time is later than the clock value range in decision block 155, in block 156 the UEQAM 5 holds a packet corresponding to the selected packet transmit time for transmission after a subsequent comparison to a different clock value range.

If there are any calculated transmit times remaining to be compared in block 157, in block 158 the UEQAM 5 selects an uncompared one of the calculated transmit times for comparison with the determined clock value range. The process repeats at block 153 for the newly selected transmit time.

If there are no calculated transmit times remaining to be compared in block 157, in block 159 the UEQAM 5 schedules transmission of undropped and unheld ones of the packets that correspond to the transmit times. Such modulated packet representations are transmitted in order from earliest corresponding packet transmit time to latest corresponding transmit time. As previously discussed, scheduling transmission can include scheduling transmission of MPEG NULL packets.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus for multiplexing a plurality of data streams received over a packet switched network for transfer over a modulated channel that extends through a constant transmission delay network, the apparatus comprising:
   a first component to determine preferred transmission times for transmitting modulated representations of received packets over the plurality of data streams, the determined transmission times based on timestamps included in the received packets;

a local clock to provide a clock value; and
a second component to compare the clock value to the determined transmission times, to schedule transmission of at least a portion of the modulated packet representations over the modulated channel according to the comparison;
wherein the second component is further operable to:
identify a time range that corresponds to the clock value, the time range being bounded by the clock value and a different clock value;
identify a portion of the determined transmission times within the time range;
identify one of the determined transmission times from the portion that is earliest; and
transmit one of the modulated representations that corresponds to the identified earliest transmission time.

2. The apparatus of claim 1, wherein the second component multiplexes a plurality of flows onto the modulated channel according to the comparison of the clock value and the determined transmission times.

3. The apparatus of claim 2, further comprising:
the first component configured to generate a command packet separate from the packets received over the data streams, the generated command packet corresponding to a particular one of the plurality of flows;
the first component configured to insert a particular one of the determined transmission times into the generated command packet and transmit the command packet to a queue for the particular flow; and
the second component configured to access the command packet from the queue and to perform the comparison responsive to said accessing.

4. The apparatus of claim 1, wherein the second component is further operable to:
identify a portion of the packets having determined transmission times that are earlier than both of the clock values; and
drop the identified packets.

5. The apparatus of claim 1, wherein the second component is further operable to:
identify a portion of the packets having determined transmission times that are later than both of the clock values; and
hold the identified portion of the packets for transmission according to a subsequent comparison using a different time range.

6. The apparatus of claim 1, wherein the second component is further operable to:
identify an earliest remaining one of the determined transmission times from the identified portion; and
transmit one of the modulated representations that corresponds to the identified earliest remaining transmission time sequentially after transmission of the modulated representation that corresponds to the previously identified earliest transmission time.

7. The apparatus of claim 6, wherein the second component is further operable to:
repeat said identification from the remaining transmission times and associated transmitting until all modulated representations corresponding to the identified portion have been transmitted.

8. An apparatus for multiplexing a plurality of data streams received over a packet switched network for transfer over a modulated channel that extends through a constant transmission delay network, the apparatus comprising:
a first component to determine preferred transmission times for transmitting modulated representations of received packets over the plurality of data streams, the determined transmission times based on timestamps included in the received packets;
a local clock to provide a clock value; and
a second component to compare the clock value to the determined transmission times, to schedule transmission of at least a portion of the modulated packet representations over the modulated channel according to the comparison;
wherein the first component is further operable to:
generate a command-packet-descriptor for each of the received packets;
insert the determined transmission time for each received packet into a corresponding one of the command-packet-descriptors;
insert information to be used for re-stamping the received packets into the command-packet-descriptors; and
transfer the command-packet-descriptors to the second component.

9. The apparatus of claim 8, wherein the first component is further operable to:
for each command-packet-descriptor, insert a flow identifier therein, the flow identifier indicating a correspondence between the command-packet-descriptor and one of the data streams; and
store the command-packet-descriptors in different queues according to the inserted flow identifiers.

10. A method, comprising:
receiving, at a gateway between a variable delay network and a constant delay network, a plurality of data streams from the variable delay network to be multiplexed over a modulated channel extending through the constant delay network;
generating, using a first processing device of the gateway, command packets corresponding to data packets included in the received data streams, the generated command packets including transmit time indications;
using the first processing device, marking each one of the generated command packets with a respective address to associate each generated command packet with a corresponding one of the data packets;
accessing, using a second different processing device, the transmit time indications included in the command packets and scheduling, according to the transmit time indications, transmission of modulated packets representing the received data streams over the modulated channel.

11. The method of claim 10, further comprising, using the first processing device, calculating the transmit time indications based at least in part on a local clock of the gateway.

12. The method of claim 10, further comprising:
generating, using the first processing device, a command-packet-descriptor for a data packet of the plurality of data streams;
inserting, using the first processing device, the determined transmission time for the data packet into the command-packet-descriptor;
inserting, using the first processing device, information to be used for re-stamping the data packet into the command-packet-descriptor; and
transferring the command-packet-descriptors to the second processing device.

13. An apparatus, comprising:
a first network interface coupled to a variable delay network, the first network interface to receive a plurality of data streams;

a second network interface coupled to a constant delay network, the second network interface to transmit data over a modulated channel that extends through the constant delay network;

a first processing device configured to determine preferred transmission times for transmitting modulated packet representations of packets of the data streams, the preferred transmission time based on timestamps included in the packets;

a local clock to provide a clock value; and a second different processing device configured to compare the clock value to the determined transmission times, the second processing device configured to schedule transmission of at least a portion of the modulated packet representations over the modulated channel according to the comparison.

14. The apparatus of claim 13, wherein the second processing device is configured to:
   identify a time range that corresponds to the clock value, the time range being bounded by the clock value and a different clock value;
   identify a portion of the packets having determined transmission times that are earlier than both of the clock values; and
   drop the identified packets.

15. The apparatus of claim 13, wherein the second processing device is configured to:
   identify a time range that corresponds to the clock value, the time range being bounded by the clock value and a different clock value;
   identify a portion of the packets having determined transmission times that are later than both of the clock values; and
   hold the identified portion of the packets for transmission according to a subsequent comparison using a different time range.

16. The apparatus of claim 13, wherein the second processing device is configured to:
   identify a time range that corresponds to the clock value, the time range being bounded by the clock value and a different clock value;
   identify a portion of the determined transmission times within the time range;
   identify one of the determined transmission times from the portion that is earliest; and
   transmit one of the modulated packet representations that corresponds to the identified earliest transmission time.

17. The apparatus of claim 16, wherein the second processing device is configured to:
   identify an earliest remaining one of the determined transmission times from the identified portion; and
   transmit one of the modulated representations that corresponds to the identified earliest remaining transmission time sequentially after transmission of the modulated representation that corresponds to the previously identified earliest transmission time.

18. The apparatus of claim 17, wherein the second processing device is configured to repeat said identification from the remaining transmission times and associated transmitting until all modulated representations corresponding to the identified portion have been transmitted.

19. The apparatus of claim 13, wherein the first processing device is configured to:
   generate a command-packet-descriptor for each of the packets;
   insert the determined transmission time for each packet into a corresponding one of the command-packet-descriptors;
   insert information to be used for re-stamping the packets into the command-packet-descriptors; and
   transfer the command-packet-descriptors to the second processing device.

20. The apparatus of claim 19, wherein the first processing device is configured to:
   for each command-packet-descriptor, insert a flow identifier therein, the flow identifier indicating a correspondence between the command-packet-descriptor and one of the data streams; and
   store the command-packet-descriptors in different queues according to the inserted flow identifiers.

* * * * *